US006658420B1

United States Patent
Brinnand et al.

(10) Patent No.: US 6,658,420 B1
(45) Date of Patent: Dec. 2, 2003

(54) INDEPENDENT LOG CONTAINMENT HIERARCHY

(75) Inventors: John P. Brinnand, Sunnyvale, CA (US); Rajeev Angal, Santa Clara, CA (US); Balaji V. Pagadala, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/330,514

(22) Filed: Jun. 11, 1999

(51) Int. Cl.$^7$ .......................... G06F 7/00; G06F 15/173
(52) U.S. Cl. ........................................ 707/100; 709/223
(58) Field of Search ................................. 709/245, 206, 709/230, 238, 330; 713/167–168; 714/38, 32, 4; 712/28; 716/2

(56) References Cited

U.S. PATENT DOCUMENTS

| | | | |
|---|---|---|---|
| 5,850,511 A | * 12/1998 | Stoecker et al. | 714/38 |
| 6,041,350 A | 3/2000 | Takimoto | 709/223 |
| 6,178,505 B1 | * 1/2001 | Schneider et al. | 713/168 |
| 6,216,168 B1 | * 4/2001 | Dev et al. | 709/245 |
| 6,282,568 B1 | 8/2001 | Sondur et al. | 109/223 |
| 6,404,743 B1 | * 6/2002 | Meandzija | 370/254 |

OTHER PUBLICATIONS

"SNMP, SNMPv2, and CMIP: The Practical Guide to Network–Management Standards"; William Stallings; 1993; Addison–Wesley Publishing Company, Reading, Massachusetts; pp. 429–449.
CCIT, The International Telegraph and Telephone Consultative Committee; International Telecommunication Union; "Data Communication Networks"; X.721; Geneva, 1992.

\* cited by examiner

*Primary Examiner*—Wayne Amsbury
*Assistant Examiner*—Te Yu Chen
(74) *Attorney, Agent, or Firm*—Meyertons Hood Kivlin Kowert & Goetzel, P.C.; Rory D. Rankin; B. Noël Kivlin

(57) ABSTRACT

Method and system for configuring a network computer to distinguish between a first address path for a first logging module and a second address path for a second logging module for a log report, using full distinguished names (FDNs) that provide first and second address paths for the first and second logging modules, where the first and second address paths have different object level addresses at an object level immediately below the root level. Where a local distinguished name (LDN) (or relative distinguished name RDN) is used for an address path, the system forwards a log report to an associated Log Server only if the first component of the address path is a selected object level address, such as '/system'.

10 Claims, 4 Drawing Sheets

INDEPENDENT LOG CONTAINMENT HIERARCHY

CROSS REFERENCE TO RELATED PATENT APPLICATIONS

This patent application is related to other patent applications, filed herewith on the same day and entitled "Apparatus, Methods and Computer Program Products For Network Management Operations Relating To Network Management Protocol Adapter Security Software (MPASS) For Single And Multiple Users", Ser. No. 09/330,902; "Apparatus, Methods, and Computer Program Products for Network Management Operations Relating to Network Management Protocol Adapter Security Software (MPASS) for Secure Association. and Setup", Ser. No. 09/330,932; "Apparatus, Methods, And Computer Program Products For Network Management Operations Relating To Network Management Protocol Adapter Security Software (Mpass) For Messaging With User Name Access Identification", Ser. No. 09/330,521; "Domain Access Control For Logging Systems", Ser. No. 09/332,270, now U.S. Pat. No. 6,542,932; and "Distinguished Name Scoping System For Event Filtering", Ser. No. 09/330,790, now U.S. Pat. No. 6,484,200. These related patent applications are hereby expressly referenced and incorporated herein in their entirety.

COPYRIGHTS IN PATENT MATERIAL

Portions of this patent document contain material subject to copyright restriction. The copyright owner has no objection to facsimile reproduction of the patent document after grant, as it appears in the U.S. Patent and Trademark Office files or records, but otherwise reserves all rights relating thereto.

TECHNICAL FIELD

This invention relates to a system for distinction between relative names and full names of objects in a computer network system.

BACKGROUND OF THE INVENTION

Presently, a log server uses a systemId identifier to identify objects and other entities associated with a log record, as part of a "log containment hierarchy." A log server creates all logs only under '/system' object instance and uses the logId corresponding to a relative distinguished name (RDN) to distinguish one log record from another. Use of an RDN, rather than a full distinguished name (FDN), to distinguish log records limits the number of names that can be distinguished in such a system. What is needed is a log record system that allows distinction between user or object names but maintains sufficient flexibility to allow operation under the older (RDN) system as well. Preferably, the system should allow establishment of logging module, or log, at different object levels.

SUMMARY OF THE INVENTION

These needs are met by the invention, which provides a system creating logs under, other than, and in addition to, the '/system' object instance. This is implemented, in part, by reconfiguring the log server to refer to an FDN for a log, rather than referring to the log by an RDN. This permits reference to object instances other than systemId="SYS" at level 0, which is usually located just below the root level or its equivalent. A log is referred to using any user-defined naming root (referred to herein simply as "TOP"). A log can now reside in multiple branches of the management information tree (MIT), distinguished by use of an FDN to refer to all object levels in a path that reaches the particular log sought. An example would be the specifications /networkId/managedElement/logId=string"LOGA"

and

/systemId/logId=string"LOGA", which may refer to and obtain access to the same log, using different FDN designations.

DESCRIPTION OF PREFERRED MODE OF THE INVENTION

Figure 1:
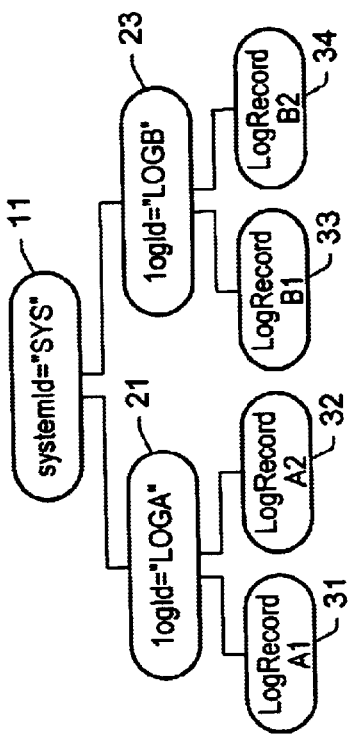
FIG. 1 illustrates a log containment system according to the prior art.

In a conventional system for log containment, the top level assignment 11 is systemId="SYS", as illustrated in FIG. 1. From this old top level, a user chooses a second level assignment, such as logId="LOGA" 21 or logId="LOGB" 23 to gain access to the named log. Thereafter, the user specifies a third level assignment, such as 31, 32, 33 or 34, to view a particular record or group of records, or searches through the log records, or adds or deletes a record corresponding to an event notification. The system illustrated in FIG. 1 uses a relative distinguished name (RDN) format for naming an object, such as logId="LOGA"/LogRecord, where it is understood that the first component of the name below the common root is systemId="SYS" for any logging module. Use of an RDN format shortens the notation but does not permit establishment of a logging module at more than one object level and does not permit location of a logging module under any first component except systemId="SYS".

Figure 2:
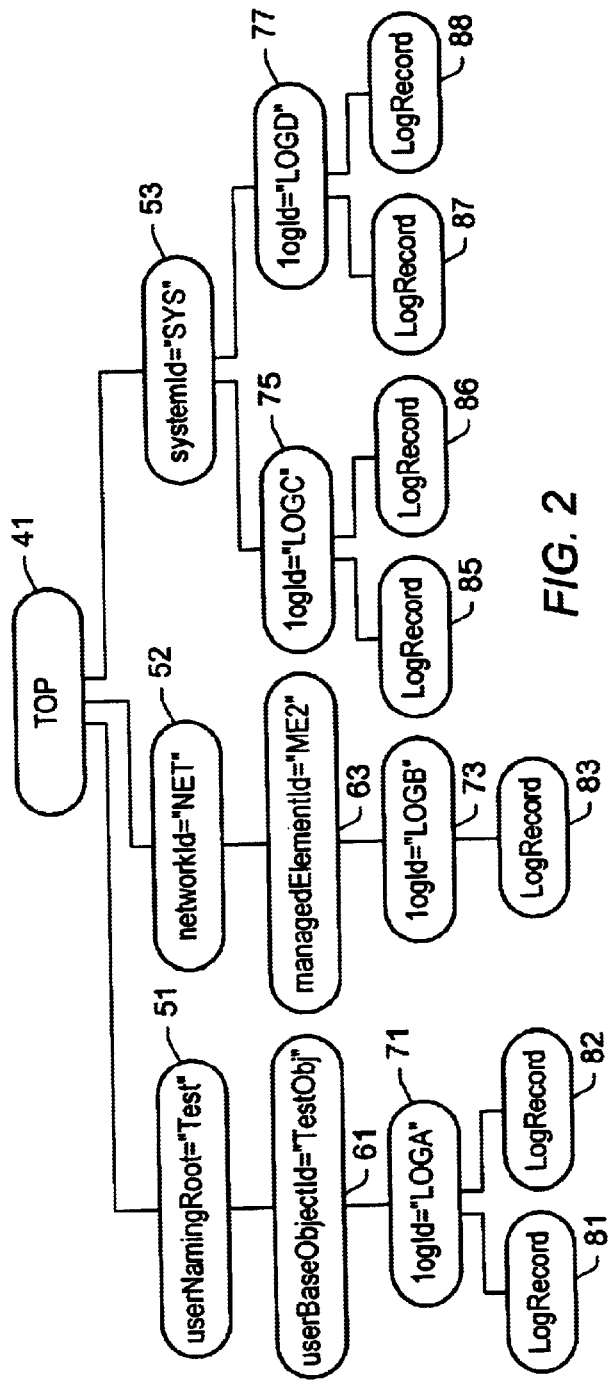
FIG. 2 illustrates a log containment system according to the invention.

The invention improves this approach by using a full distinguished name (FDN) for naming purposes in log containment, but including the conventional RDN-based object naming for backward compatibility with conventional naming systems. For log containment according to the invention, the top level (root) assignment 41 is TOP, or some other suitable name, as illustrated in FIG. 2. The first assignment level below TOP may specify a new mode, such as userNamingRoot="TEST" 51, or networkId="NET" 52, or may specify the older mode systemId =systemId="SYS" 53.

A second assignment level for the new modes allows specification of userBaseobjectId="TestObj" 61 or managedElementId="ME2" 63, for example. No corresponding assignment level is present in the older mode, and this second assignment level is optionally treated as blank or empty or is ignored for the path beginning with the assignment systemId="SYS".

A third assignment level requires specification of the particular log for which access is sought. For the new modes, this might be logId="LOGA" 71 or logId="LOGB" 73, as shown in FIG. 2. For the older mode, this second level of assignment might by logId="LOGC" 75 or logId="LOGD" 77.

A fourth assignment level requires specification of one or more log records for which access is sought, or that are to be added or deleted, indicated as simply LogRecord in FIG. 2. Additional levels of assignment can be made, depending upon the complexity of the log containment hierarchy. Specification of the names of two or more directly connected object levels (e.g., n and n+1) specifies an address path to reach a particular managed object at the appropriate object level. Note that logs, or logging modules, in FIG. 2 may appear at different object levels.

In order for the system to support these levels of assignment, and to allow creation of the same log(s) under different named roots, the management information server (MIS), the Log server, the Alarm Services module and the name database should be reconfigured. These modules are involved in creating a Log from a CMIS request.

In any such naming or addressing scheme, an object expressed in FDN format, such as /networkId="NET"/managedElementId="ME2"
 /logId=LOGB/LogRecord may be characterized as an address path from a beginning object level to an object address at a second object level. A name or address expressed in RDN format may also be characterized as an address path from a beginning object level to an object address at a second object level. A name or address may also be expressed in a local distinguished name (LDN) format, which is a foreshortened version of RDN format that points to the object level address, beginning at an adjacent object level.

At least four network processing areas are affected by, and will preferably change in implementing, the invention: the MIS, the Log Server, the AlarmServices and the Database.

Figure 3:
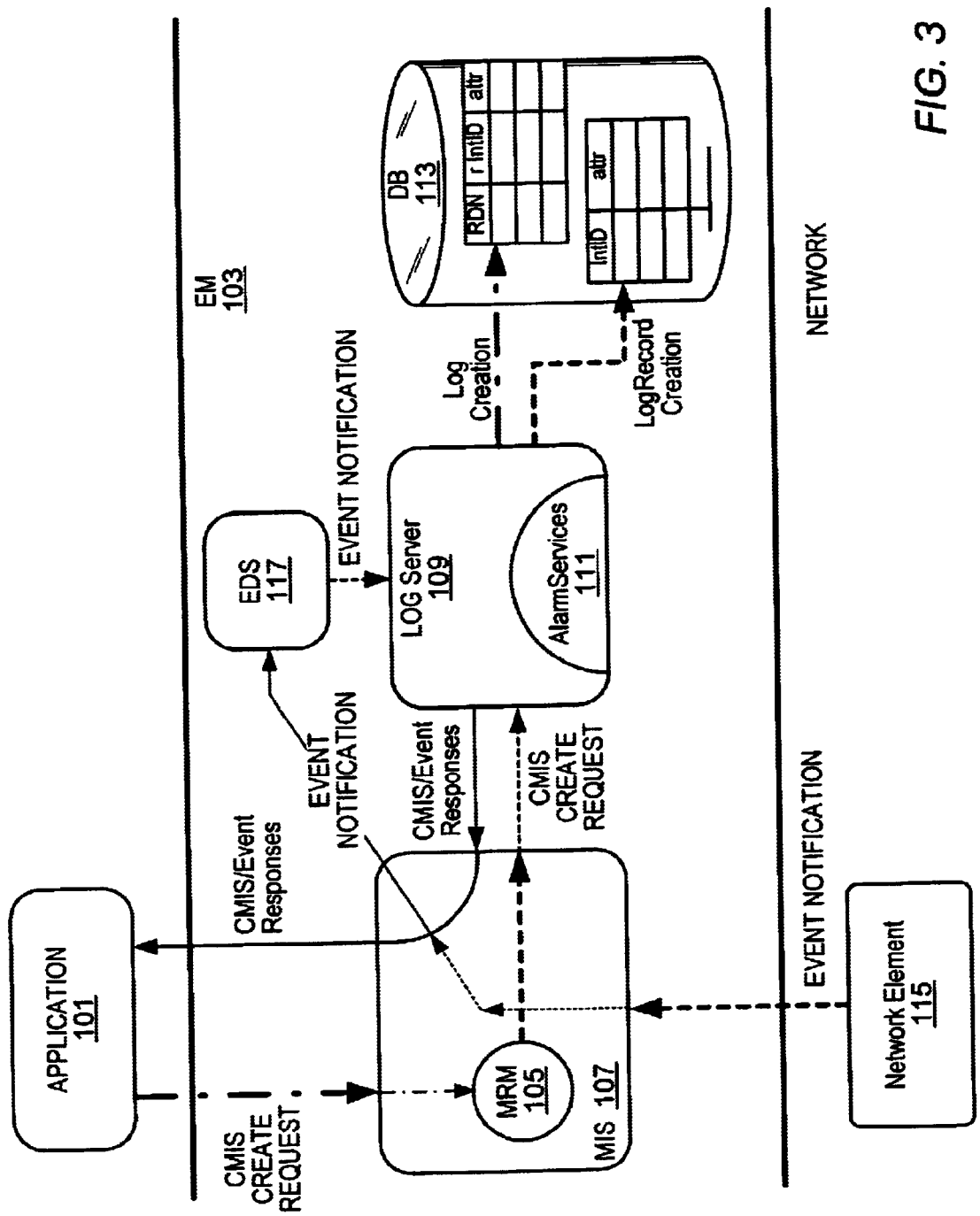
FIG. 3 is a schematic view of signal processing at an Enterprise Manager level according to the invention.

FIG. 3 indicates how these affected areas work together. An application forwards a received M-Create Request (with confirmation required) to an MRM (Message Routing Module) 105 that is part of a management information system (MIS) 107. The MRM 105 processes the M-Create Request and subsequently forwards this request to a suitable Log server 109. When the MIS 107 receives an M-Create Request, the MIS responds as follows: (1) if the object instance of the Request is in LDN format, the MRM 105 forwards the Request to the local Log server 109; (2) if the object instance of the Request is in FDN format, the MRM 105 forwards the Request only if the first component of the name is '/system'. The system, according to one embodiment of the invention, forces the MIS or MRM to forward all Log requests to the Log server regardless of the managed object instance (MOI) corresponding to the request.

An M-Create request is one of six management operations services provided by a common management information services element (CMISE). These services are discussed in some detail by William Stallings, SNMP, SNMPv2 and CMIP, Addison-Wesley Publ. Co., 1993, pp. 429–449. A M-Create request creates a request that a peer CMISE service user create an instance of a specified managed object and requires confirmation that the request has been received and understood.

In implementing the invention, the MRM object is preferably changed to distinguish between a name or address, expressed in FDN format and in RDN (or LDN) format.

The Log server is affected the most by the changes in the log containment hierarchy according to the invention. The conventional approach assumes that the name binding of a log object is always under the 'system' root. With this conventional approach, the Log server discards the systemId portion of the name and uses only the remaining LDN portion of the name to distinguish one log from another, at the object level of a log or plurality of logs. Where the approach of the invention is adopted, this conventional assumption must be changed substantially. Currently, the Log server is constructed around two global hash structures that focus on the LDN portion of a name.

The first hash structure, the logging service, is provided by a LogHandle class, which provides an internal; representation of a Log object instance and also provides services for creation, deletion, retrieval and updates for any given log object. The LogHandle class also provides event notification (EN) filtering based on event type. The LogHandle class is associated with the LogRecord class, which receives all incoming ENs and creates a log record of the EN. At the lower end of the structure, the LogHandle class uses the services of the LogMapper to perform all database operations, such as creation, deletion, retrieval and update, on all log objects and all log record objects.

Figure 4:
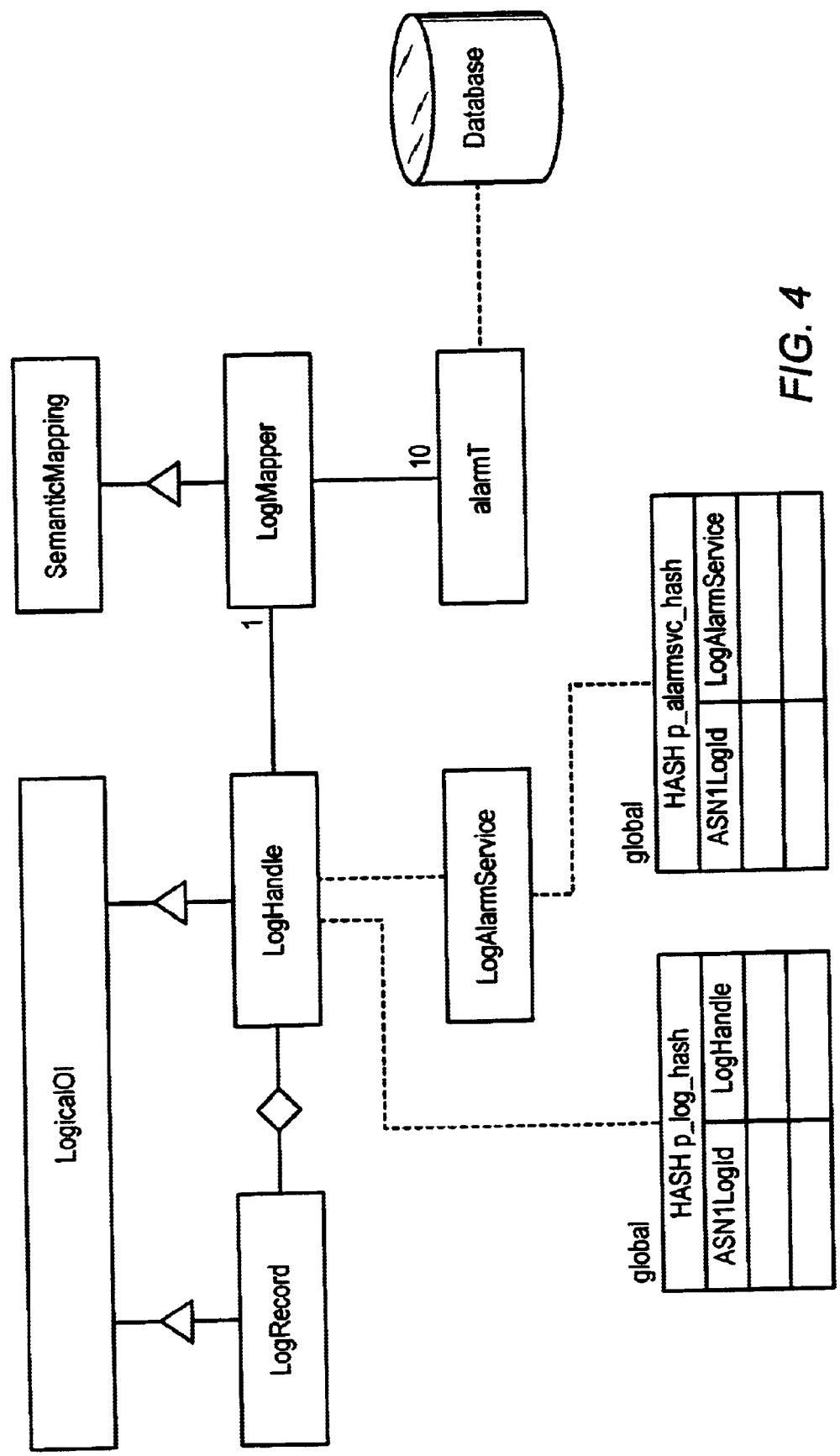
FIG. 4 is a schematic view of conventional Log Server architecture.

The second hash structure is alarm services, which allows a user to acknowledge and clear alarm events. Whereas the log service focuses on log records, the alarm service focuses on MOIs. FIG. 4 is a schematic diagram showing a conventional Log server architecture.

According to the invention, the (new) Log Server must support all log name bindings, not merely those whose first component is '/system'", so that the Log Server must be changed. A datatype can now be represented in an LDN format (the conventional approach) or in an FDN format. The first component in a full address path or FDN might be a naming root, designated "TEST", or a network id, such as "NET", as well as the more familiar "SYS", as illustrated in FIG. 2. To preserve backward compatibility, a message that is in LDN format and contains a logId will by default be treated as referring to /systemId=localhost/logId="logName"

as in a conventional treatment. However, all other Create requests will require reading of the full FDN, and the associated logIds will be stored in FDN format.

In implementing the invention, the LogHandle, Global Func log.cc, Global Func log_mit.cc, Global Func log_util.cc, Global Func log_driver.cc, Pending Requests, LogRecord, LogicalOI, AuxServices and LogMapper objects are preferably changed to distinguish between a name or address, expressed in FDN format, in RDN format and in LDN format.

The focus of the invention is to be able to distinguish at any time between address paths in RDN (or LDN) format and FDN format. An address path expressed in RDN format is a relative path, which may begin at any object level and descend to the object level of interest. An address path expressed in FDN format requires expression of the full path beginning at the first address path component just below the common root level.

An address path expressed in FDN format is not parsed but is accepted and processed as a whole. This allow a log object to be placed at any object level in the management information tree (MIT). A log object is thus relocatable and can conform to different user requirements.

By contrast, an address path expressed in RDN format will be parsed, as done conventionally. All log objects created within an RDN format are placed under the 'system' containment hierarchy. This is the default behavior and is adopted to maintain backward compatibility with the conventional approach.

An FDN object and an RDN object in the Log Server are represented by different datatypes at different times, depending upon context. In some regions of the code, the logId is an ASCII string, and in other regions the logId is an ASN.

1 (Abstract Syntax Notation 1) value as is well known in the computer programming and networking arts.

If the datatype is a string, an RDN object and an FDN object will be distinguished by the first character of the string ("/"). If the datatype is an asn1 value, an RDN object and an FDN object are distinguished based on the Tag_Cont value: if the tag is C4, the MOI is in RDN format; if the tag is C2, the MOI is in FDN format; and if the tag is C3, the MOI is treated as a string. If the datatype is DataUnit, the distinction between an RDN object and an FDN object will be the same as for a string.

The AlarmServices is implemented in the Log Server, with independent functionality that is available only to the logs that subscribe to it. In one embodiment, the LogHandle and Global Func log_main.cc objects are modified to recognize and respond to the FDN format.

Currently, a Database log table holds all the log attributes, with one entry per log created in the system. An AttributeValue associated with the logId is stored in the log table, together with all the other attributes that instantiate a log object in the MIS. This design imposes the requirement that all logs in the EM (Enterprise Manager) domain must have different logIds. In implementing the invention, the database schema is preferably changed so that a log FDN is stored in the log table for every log not created under '/systemId'. To maintain backward compatibility, logs created under '/systemId' will store only an RDN format path of the logId attribute value. In one embodiment, the log object is modified to implement these design changes.

Figure 5:
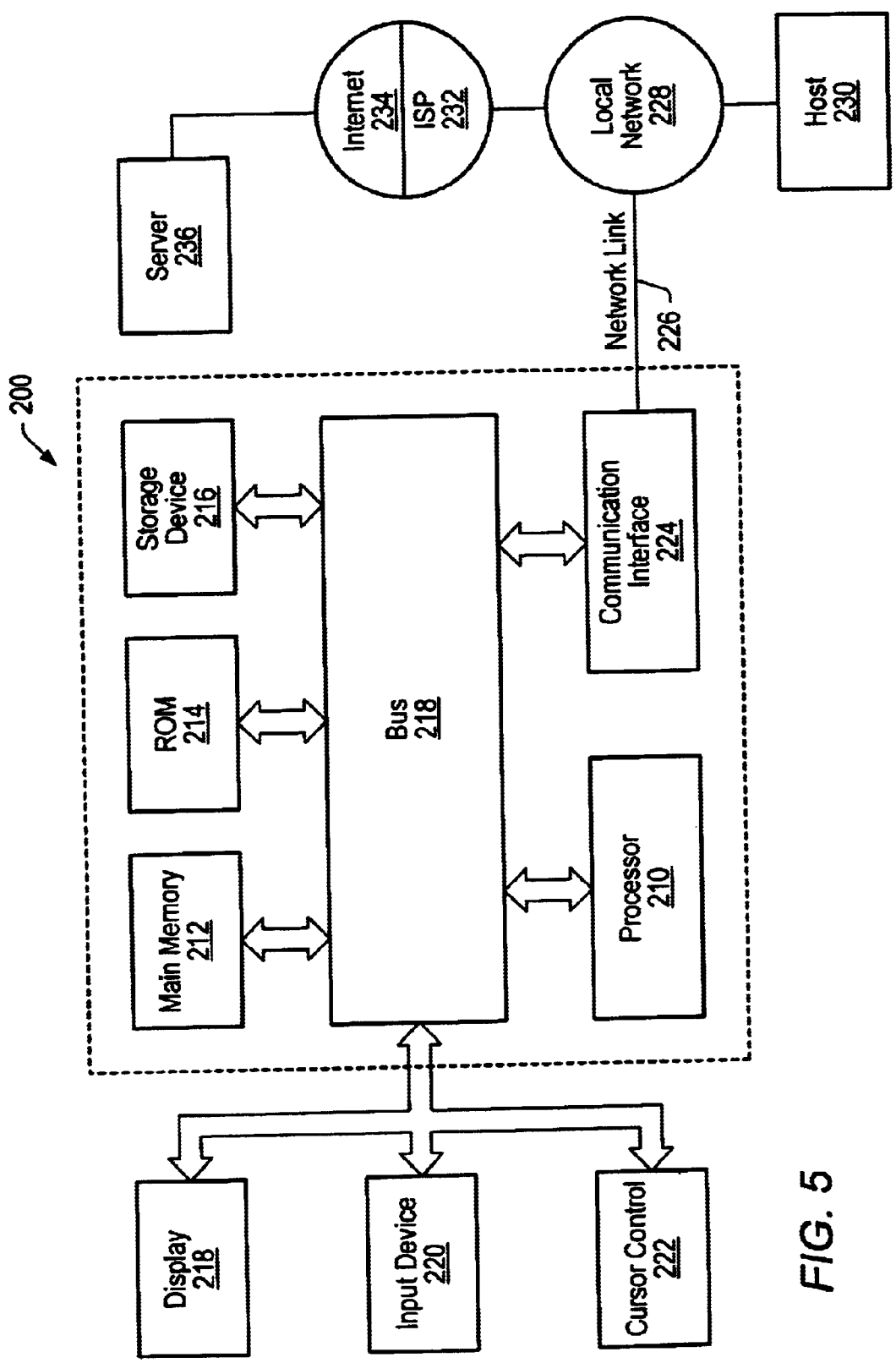
FIG. 5 is a schematic view of a computer system.

FIG. 5 shows a block diagram of a general computer system 200, which may be used to implement various hardware components of the invention, such as a client an applications server and a database management system. The computer system 200 includes a bus 208 or other communication mechanism for communicating information and a processor 210, coupled with the bus 208, for processing information. The computer system 200 also includes a main memory 212, such as a random access memory (RAM) or other dynamic storage device, coupled to the bus 208, for storing information and instructions to be executed by the processor 210. The main memory 212 also may be used for storing temporary variables or other intermediate information during execution of instructions by the processor 210. The computer system 200 further optionally includes read only-memory (ROM) 214 or other static storage device, coupled to the bus 208, for storing static information and instructions for the processor 210. A storage device 216, such as a magnetic disk or optical disk, is provided and is coupled to the bus 208 for storing information and instructions.

The computer system 200 may also be coupled through the bus to a display 218, such as a cathode ray tube (CRT), for displaying information to a computer user. An input device 220, including alphanumeric and other keys, is coupled to the bus for communicating information and commands to the processor 210. Another type of user input device is a cursor control 222, such as a mouse, a trackball or cursor direction keys for communicating direction information and command selections to the processor 210 and for controlling cursor movement on the display 218. This input device typically has one degree of freedom in each of two axes, such as x- and y-axes, that allows the device to specify locations in a plane.

The functionality of the invention is provided by the computer system 100 in response to the processor 210 executing one or more sequences of instructions contained in main memory 212. These instructions may be read into main memory 212 from another computer-readable medium, such as a storage device 216. Execution of the sequences of instructions contained in the main memory 212 causes the processor 210 to perform the process steps described herein. In alternative embodiments, hard-wired circuitry may be used in place of, or in combination with, software instructions to implement the invention. Embodiments of the invention are not limited to any specific combination of hard-wired circuitry and software.

The term "computer-readable medium", as used herein, refers to any medium that participates in providing instructions to the processor 210 for execution. This medium may take many forms, including but not limited to non-volatile media, volatile media and transmission media. Non-volatile media includes, for example, optical and magnetic disks, such as the storage disks 216. Volatile media includes dynamic memory 212. Transmission media includes coaxial cables, copper wire and fiber optics and includes the wires that are part of the bus 208. Transmission media can also take the form of acoustic or electromagnetic waves, such as those generated during radiowave, infrared and optical data communications.

Common forms of computer-readable media include, for example, a floppy disk, a flexible disk, a hard disk, magnetic tape or any other magnetic medium, a CD-ROM, any other optical medium, punchcards, papertape, any other physical medium with patterns of holes or apertures, a RAM, a ROM, a PROM, an EPROM, a Flash-EPROM, any other memory chip or cartridge, a carrier wave as described hereinafter, or any other medium from which a computer can be read.

Various forms of computer-readable media may be involved in carrying out one or more sequences of one or more instructions to the processor 210 for execution. For example, the instructions may initially be carried on a magnetic disk of a remote computer. The remote computer can load the instructions into its dynamic memory and send the instructions over a telephone, using a modem. A modem local to the computer system 200 can receive data over a telephone line and use infrared transmitter to convert and transmit the data to the an infrared detector connected to the computer system bus. The bus will carry the data to the main memory 212, from which the processor receives and executes the instructions. Optionally, the instructions receive by the main memory 212 can be stored on the storage device 216, either before or after execution by the processor 210.

The computer system 200 also includes a communications interface 224, coupled to the bus 208, which provides two-way data communication coupling to a network link 226 that is connected to a local area network (LAN) or to a wide area network (WAN). For example, the communications interface 224 may be an integrated services digital network (ISDN) card or a modem to provide a data communication connection to a corresponding type of telephone line. As another example, the communications interface 224 may be a local area network card to provide a data communication connection to a compatible LAN. Wireless links may also be implemented. In any such implementation, the communications interface 224 sends and receives electrical, electromagnetic or optical signals that carry digital data streams representing various types of information.

The network link 226 typically provides data communication through one or more networks to other data devices. For example, the data link 226 may provide a connection through an LAN 228 to a host computer 230 or to data equipment operated by an Internet Service Provider (ISP) 232. The ISP, in turn, provides data communication services through the world wide packet data communication network, now commonly known as the "Internet" 234, served by one or more servers 236. The LAN 228 and the Internet 234 both use electrical, electromagnetic and/or optical signals to carry the digital data streams. The signals carried by these network, the signals carried on the network link 226 and the signals carried on the communications interface 224, are examples of carrier waves that transport the information.

What is claimed is:

1. An enterprise management (EM) system for managing objects in a log containment hierarchy, the EM system comprising:
   a management information server (MIS) operable to receive a request corresponding to a managed object, wherein a local distinguished name format or a fill distinguished name format may be used to identify the managed object;
   a database coupled to store the managed object in a multi-level hierarchy, wherein each level within the hierarchy corresponds to a name component in an address path,
      wherein the address path is represented by an ASCII string,
      wherein the local distinguished name format comprises a partial address path consisting of a system ID, a logID, and a log record name, and
      wherein the full distinguished name format comprises a full address path, wherein the first name component of the full address path may be a naming root, a network ID or a system ID, and wherein the full address path may specify any location within the hierarchy,
   a log server coupled to instantiate the managed object and store it in the database,
      wherein the log server is operable to store the managed object under a system ID name component when the managed object is identifiable by a local distinguished name and store the managed object under the full address path when the object is identified by a full distinguished name, and
      wherein the log server is operable to distinguish a partial address path from a full address path by examining the first character of are ASCII string address path.

2. The system of claim 1, wherein the database comprises a log table which contains one entry per log,
   wherein the log table is operable to store a full address path for every log not stored under a system ID name component, and
   wherein the log table stores a partial address path for every log stored under a system ID name component.

3. A method for managing objects in a log containment hierarchy, the method comprising:
   receiving a request corresponding to a managed object, wherein a local, distinguished name format or a full distinguished name format may be used to identify the managed object;
   instantiating the managed object in a multi-level hierarchy, wherein each level within the hierarchy corresponds to a name component in an address path, wherein the address path is represented by an ASCII string,
      wherein the local distinguished name format comprises a partial address path consisting of a system ID, a logID, and a log record name, and
   wherein the full distinguished name format comprises a full address path, wherein the first name component of the full address path may be a naming root, a network ID or a system ID, and wherein the full address path may specify any location within the hierarchy;
   storing the managed object under a system ID name component when the managed object is identifiable by a local distinguished name and store the managed object under the full address path when the object is identified by a full distinguished name, and
   distinguishing a partial address path from a full address path by examining the first character of an ASCII string address path.

4. The method of claim 3 further comprising storing a full address path in a log table for every log not stored under a system ID name component and storing a partial address path in a log table for every log stored under a system ID name component.

5. An enterprise management (EM) system for managing objects in a containment hierarchy, the EM system comprising:
   a management information server (MIS) operable to receive a request corresponding to a managed object, said request corresponding to a manages object, said request including a corresponding address path indicative of where said managed object may be reached within said hierarchy, the address path including the names of two or more directly connected object levels in the hierarchy;
   a database configured to store the managed object; and
   a log server coupled to the MIS and the database, wherein the log server is operable to:
      instantiate the managed object;
      store the managed object under a default object level root, in response to detecting said address path comprises a relative distinguished name (RDN);
      store the managed object under an object level root expressly indicated by the address path, in response to detecting the address path comprises a full distinguished name (FDN); and
      distinguish an RDN from and FDN by detecting said address path comprises an ASCII string, and examining the first character of the string.

6. An enterprise management (EM) system for managing objects in a log containment hierarchy, the EM system comprising:
   a management information server (MIS) operable to receive a request corresponding to a managed object, wherein a local distinguished name format or a full distinguished name format may be used to identify the managed object;
   a database coupled to store the managed object in a multi-level hierarchy, wherein each level within the hierarchy corresponds to a name component in an address path,
      wherein the address path is represented by an asn1 value,
      wherein the local distinguished name format comprises a partial address path consisting of a system ID, a logID, and a log record name, and
      wherein the full distinguished name format comprises a full address path, wherein the first name component of the full address path may be a naming root, a network ID or a system ID, and wherein the full address path may specify any location within the hierarchy;

a log server coupled to instantiate the managed object and store it in the database, wherein the log server is operable to store the managed object under a system ID name component when the managed object is identifiable by a local distinguished name and store the managed object under the full address path when the object is identified by a full distinguished name, and wherein the log server is operable to distinguish a full address path from a partial address path by examining the Tag_Cont value in an asn1 address path.

7. The system of claim 6, wherein the database comprises a log table which contains one entry per log, wherein the log table is operable to store a full address path for every log not stored under a system ID name component, and wherein the log table stores a partial address path for every log stored under a system ID name component.

8. A method for managing objects in a log containment hierarchy, the method comprising:

receiving a request corresponding to a managed object, wherein a local distinguished name format or a full distinguished name format may be used to identify the managed object;

instantiating the managed object in a multi-level hierarchy, wherein each level within the hierarchy corresponds to a name component in an address path, wherein the address path is represented by an asn1 value, wherein the local distinguished name format comprises a partial address path consisting of a system ID, a logID, and a log record name, and wherein the full distinguished name format comprises a full address path, wherein the first name component of the full address path may be a naming root, a network ID or a system ID, and wherein the full address path may specify any location within the hierarchy;

storing the managed object under a system ID name component when the managed object is identifiable by a local distinguished name and store the managed object under the full address path when the object is identified by a full distinguished name, and distinguishing a full address path from a partial address path by examining the Tag_Cont value in an asn1 address path.

9. The method of claim 8 further comprising storing a full address path in a log table for every log not stored under a system ID name component and storing a partial address path in a log table for every log stored under a system ID name component.

10. An enterprise management (EM) system for managing objects in a containment hierarchy, the EM system comprising:

a management information server (MIS) operable to receive a request corresponding to a managed object, said request corresponding to a manages object, said request including a corresponding address path indicative of where said managed object may be reached within said hierarchy, the address path including the names of two or more directly connected object levels in the hierarchy;

a database configured to store the managed object; and a log server coupled to the MIS and the database, wherein the log server is operable to:

instantiate the managed object;

store the managed object under a default object level root, in response to detecting said address path comprises a relative distinguished name (RDN);

store the managed object under an object level root expressly indicated by the address path, in response to detecting the address path comprises a full distinguished name (FDN); and distinguish an RDN from and FDN by detecting said address path comprises an ASN1 value, and examining the Tag_Cont value of the ASN1 value.

* * * * *

UNITED STATES PATENT AND TRADEMARK OFFICE
CERTIFICATE OF CORRECTION

PATENT NO. : 6,658,420 B1
DATED : December 2, 2003
INVENTOR(S) : Brinnand et al.

It is certified that error appears in the above-identified patent and that said Letters Patent is hereby corrected as shown below:

Column 7,
Line 16, please replace "fill" with -- full --.
Line 44, please replace "character of are ASCII" with -- character of an ASCII --.

Signed and Sealed this

Twentieth Day of April, 2004

JON W. DUDAS
*Acting Director of the United States Patent and Trademark Office*